United States Patent [19]

Heuss et al.

[11] 4,421,990
[45] Dec. 20, 1983

[54] TIDAL POWER PLANT AND METHOD OF OPERATING THE SAME

[75] Inventors: Valentin Heuss, Uitikon/Waldegg; Helmut Miller, Bergdietikon, both of Switzerland

[73] Assignee: Escher Wyss Limited, Zurich, Switzerland

[21] Appl. No.: 412,894

[22] Filed: Aug. 30, 1982

[30] Foreign Application Priority Data

Sep. 29, 1981 [CH] Switzerland .................. 6251/81

[51] Int. Cl.$^3$ .................. F03B 13/12; E02B 9/08
[52] U.S. Cl. .................. 290/53; 105/76; 105/77
[58] Field of Search .......... 417/330; 290/42, 53, 290/52; 105/76, 77

[56] References Cited

U.S. PATENT DOCUMENTS

| | | | |
|---|---|---|---|
| 1,099,085 | 6/1914 | Hale | 405/77 |
| 2,634,375 | 4/1953 | Guimbal | 290/52 |
| 3,750,001 | 7/1973 | McCloskey | 290/52 |
| 4,274,008 | 6/1981 | Feltenberger | 290/42 |

Primary Examiner—J. V. Truhe
Assistant Examiner—Shelley Wade
Attorney, Agent, or Firm—Werner W. Kleeman

[57] ABSTRACT

A tidal power plant and method of operating the same are disclosed. In tidal power plants the turbines are arranged in channels between the sea and a storage reservoir. Heretofore known constructions of tidal power plants included relatively complex mechanisms for maintaining the turbine or turbines operating for the maximum amount of time, but generally they have failed to exceed a high overall operating efficiency. The present invention seeks to improve upon prior installations by designing a tidal power plant in which the or each turbine is disposed in a main channel between the sea and the storage reservoir. A connection channel is arranged above the main channel containing the turbine. A shutoff device is located at the reservoir side of the turbine and the connection channel to control and direct the flow of water. One of the described arrangements permits the use of a single shutoff device in the form of a sluice gate operable under pressure in order to open the connection channel and to cut-off the turbine, or vice-versa. A further possible arrangement contemplates total isolation of the working region of the tidal power plant to permit inspection and maintenance work when needed.

18 Claims, 4 Drawing Figures

TIDAL POWER PLANT AND METHOD OF OPERATING THE SAME

BACKGROUND OF THE INVENTION

The present invention broadly relates to the exploitation of tidal flow for the purpose of extracting energy therefrom, and, more specifically, concerns a new and improved construction of a tidal power plant and a method of operating the same.

Tidal power plants serving the purpose of extracting energy from tidal flow commonly employ at least one water turbine arranged between the sea and a storage reservoir separated therefrom.

Tidal power plants or installations have already been proposed, in which a storage reservoir is separated from the sea by a wall or a dam. In the presence of a rising tide, the water is conducted from the sea via a water turbine and/or openings in the wall or dam into the storage reservoir. On the other hand, when the tide falls this flow path is closed by flaps or sliders and there is opened a path in the opposite direction from the storage reservoir to the sea by means of the turbine. In this way, the turbine is traversed in the same direction during both tidal flow phases and generates energy during both such phases. This design concept proceeded from the notion that to extract as much energy as possible, both tidal flow phases or flow directions must be exploited if possible.

Tidal power plants utilizing the above concept are described, for example, in German Pat. No. 98,894, granted Jan. 23, 1897 or French Pat. No. 1,075,360, granted Apr. 14, 1954. The water turbine is preferably arranged in the dam or barrier wall so as to have a vertically extending axis. This water turbine has an inlet and an outlet in each case both on the sea side and the reservoir side. In rhythm with the tides, alternately in each case an inlet on the one side and an outlet on the other side is opened or closed by slideable flood gates or dam panels. When both inlets of the turbine are closed at the same time, a free through-flow between the sea and the reservoir is available beneath the turbine.

A disadvantage with such state-of-the-art tidal power plants is that the extraction of energy only takes place in tidal phases, in which a quick change of the sea level occurs; i.e., preferably between the maximum and minimum water level. At most times, however, the level difference which determines the efficiency of the turbine, is only relatively small, and the times which can be exploited for extracting energy with a practical efficiency are only short. In addition, it is a disadvantage that on both sides of the turbine shutoff devices are necessary which are operable under pressure, and these are therefore costly and expensive. Furthermore, the arrangement of the turbine with vertical axis and with an electric generator mounted on this axis over the turbine, necessitates a considerable overall height of the power plant as a whole, and the through-flow channel lying beneath the turbine requires an additional depth. The cost of construction and the costs of such previously known power plants were therefore considerable, apart from the generally less than optimum performance and the susceptibility to breakdown brought about by the complexity of the installation.

In U.S. Pat. No. 4,261,171, granted Apr. 14, 1981 and U.S. Pat. No. 4,279,539, granted July 21, 1981, a tidal power plant is described using a tube or Kaplan turbine with a horizontal axis and arranged in one through-flow channel between the sea and the storage reservoir. In order to make possible an extraction of energy both on rising and on falling tide cycles, with the same direction of through-flow of the turbine, the turbine is constructed so as to rotate through 180°. To obtain a free flow from the sea into the reservoir or vice-versa, the turbine is constructed so as to slide in vertical or horizontal direction, so that upon such displacement the through-flow channel is freed. Again, such power plant design is very expensive and requires complex mechanisms for the rotation and displacement of the turbine.

SUMMARY OF THE INVENTION

Therefore, with the foregoing in mind it is a primary object of the present invention to provide a new and improved tidal power plant and method of operating the same which is not afflicted with the aforementioned drawbacks and shortcomings of the prior art proposals.

Another and more specific object of the invention aims at mitigating the above disadvantages of the prior art, and, in particular, obtaining a greater efficiency for a given width of the plant, wherein the structural expenditure and overall dimensions are reduced, and there are required a smaller number of parts which are expensive and susceptible to breakdown.

Yet a further significant object of the present invention is directed to a new and improved construction of tidal power plant or installation, wherein the primary or main channel containing the turbine and the connection channel permitting through-flow of the water between the sea and the storage reservoir or basin are arranged in superimposed fashion, and a common flow control element serves to selectively control the flow of water through each of the channels.

Generally speaking, the tidal power plant of the present development in its broader aspects, comprises at least one water turbine arranged between a storage reservoir or basin separated from the sea and the sea. The water turbine may have an at least approximately horizontal axis although it need not be arranged absolutely horizontally in all instances. The turbine itself is arranged in a primary or main channel. At least one connection channel is disposed between the storage reservoir and the sea, and at least one shutoff device serves to block the passage of water through the turbine or the connection channel.

In its more specific aspects, the tidal power plant of the present development contemplates that the connection channel is arranged above the turbine and the primary or main channel in which such turbine is arranged. The shutoff device constitutes a single or common shutoff element for both channels which is provided only at one side thereof, this shutoff element preferably extending in vertical direction. Moreover, such shutoff element is operable under pressure and is selectively moveable such that it is capable of either shutting-off the turbine or the connection channel, in other words, can control the flow of water selectively either through the turbine or the connection channel. With the connection channel arranged above the turbine, a shutoff element, typically a sluice device, provided only on one side, can be used, which by virtue of its movement in a substantially vertical direction, enables effectively shutting-off the flow of water either through the turbine and its main channel or the connection channel, as desired.

During operation of a plant according to a preferred embodiment of the invention, the shutoff device is arranged on the reservoir side and closes the turbine during a rising tide such that the connection channel is open and the sea water can flow into the storage reservoir or basin. On falling tide or ebb, the shutoff device is switched such that the connection channel is closed and the water now can flow from the storage reservoir back through the turbine within the primary or main channel into the sea and thereby delivers energy. Thus, only one single or common shutoff element capable of being set or operated under pressure need be provided, and such is preferably designed as a vertically moveable flood-gate or dam panel. This common shutoff element or sluice device is used to both open and close the connection channel and the turbine. This mode of operation is realized by virtue of the arrangement of the connection channel above the main channel containing the turbine, thereby enabling the entire width of the barrier wall or dam to be exploited for the extraction of energy by the provision of turbines.

Using plants designed according to the invention in their preferred mode, at high water or high tide the storage reservoir or basin is quickly filled up and only on falling tide or ebb is energy generated through the water flowing back out of the storage reservoir. Considering the whole ebb and flood cycles, frequently a better efficiency and a higher energy output are obtainable in this manner, than in contrast with tidal plants in which energy is sought to be extracted both on rising and on falling water levels. Although energy is only generated on the falling tide, it becomes evident that the practically usable times, in which a sufficient level difference exists between the reservoir and the sea level, are longer than in tidal power plants of the heretofore known type, so that the overall efficiency and output obtainable are improved, apart from the simpler construction.

Notwithstanding the above, in certain topographical circumstances, the invention also can be used to advantage in the reverse direction; i.e., extraction of energy only on rising tide, and even also under certain prerequisites in operation alternately in both directions of through-flow.

According to an advantageous further embodiment of the invention, additional shutoff devices can be incorporated in the inventive tidal power plant, for example, to isolate the turbine for inspection and maintenance. However, these can be of most simple construction, so that they are capable of only being set or operated when there prevails a water level equilibrium; i.e., when there is no water force exerted upon the shutoff devices or gates. Such shutoff devices or gates can be beneficially used to partition or barricade the main channel containing the turbine and the connection channel on both sides thereof.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
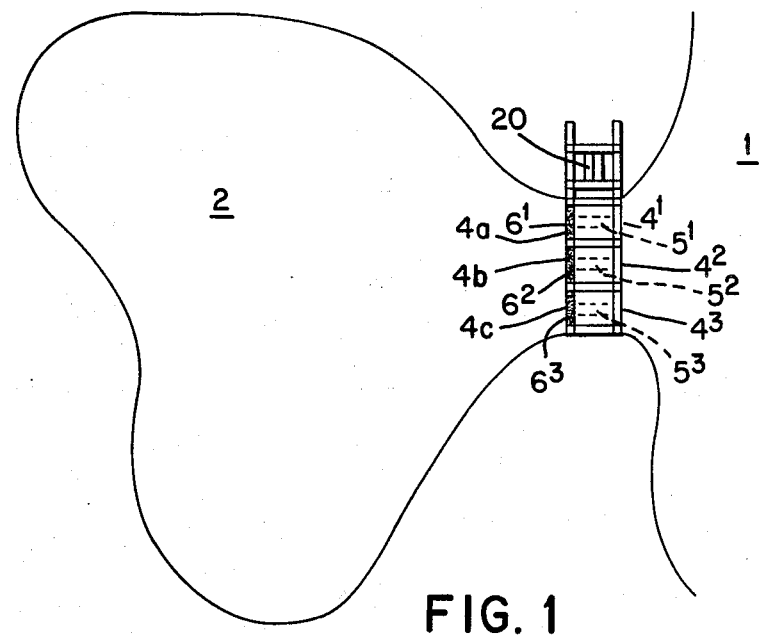
FIG. 1 illustrates in top plan view a tidal power plant according to the invention.

Describing now the drawings, as has been shown in FIG. 1, a sea bay defining a storge reservoir or basin 2 is separated from the open sea 1 by a dam or barrier wall 3 or other suitable structure, in which there are arranged adjacent to one another several power plant units, such as the depicted three power plant units 4a, 4b and 4c. Each power plant unit 4a, 4b and 4c contains a connection channel $4^1$, $4^2$ and $4^3$, respectively, which provides a flow passage between the sea 1 and the storage reservoir 2. Beneath each such connection channel $4^1$, $4^2$ and $4^3$ there is arranged a water turbine $5^1$, $5^2$ and $5^3$, respectively. At the side of the storage reservoir 2 the connection channels $4^1$, $4^2$ and $4^3$ and the turbines $5^1$, $5^2$ and $5^3$, respectively, can be selectively closed off in each case by a related shutoff device $6^1$, $6^2$ and $6^3$, respectively.

Figure 2:
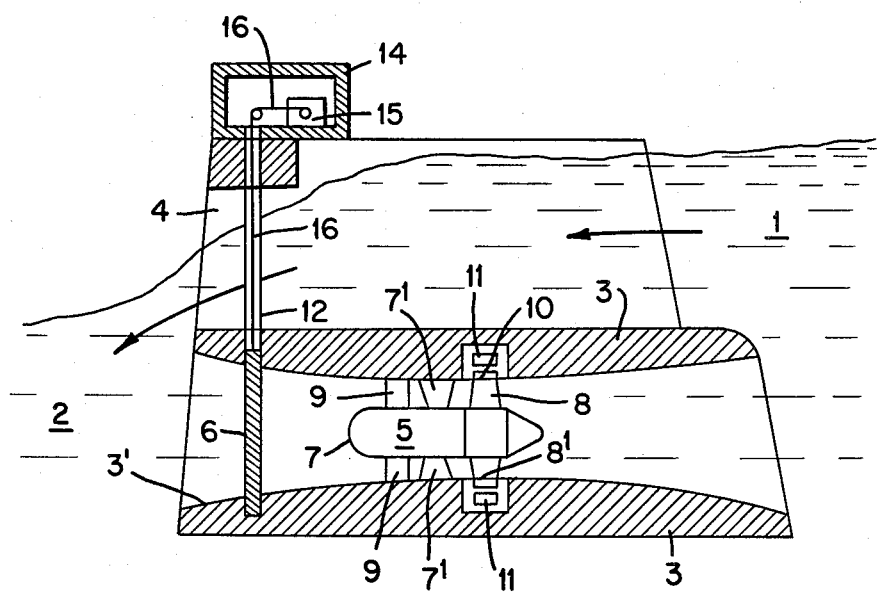
FIG. 2 schematically illustrates a vertical section through a tidal power plant according to the invention at rising tide or flood tidal cycle.

In FIG. 2 there has been shown a section through a power plant unit at high or rising tide. Here, the shutoff device 6 in the form of a shutoff gate or element is placed in front of the inlet of the turbine 5, so that the latter is blocked, i.e. the flow from the storage reservoir or basin 2 through the main or primary channel 3' provided in the dam wall 3 or the like and containing the turbine 5, and thus, through such turbine is blocked, whereas the related connection channel 4 is open, so that the water can flow from the sea 1 into the storage reservoir or basin 2 relatively quickly or freely. Since the connection or flow channel 4 can occupy the entire space above the turbine 5, i.e., since its cross-section is greater than the effective turbine cross-section, the inflow of the water is optimumly favored, without space being lost for the arrangement of the turbines.

The water turbine 5 is arranged beneath the minimum water level during the ebb tidal cycle such that a through-flow of water with a corresponding release of energy only can take place in the direction from the storage reservoir 2 to the open sea 1. The turbine 5, in the example illustrated in FIG. 2, is constructed, for instance, as an outer rim tube turbine and has a central inflow body member 7 which is anchored in the foundation of the dam 3 by means of partition or dividing walls $7^1$ and which carries a runner wheel 8 and closeable guide blades or vanes 9. The rotor 10 of an electric generator is attached to an outer rim $8^1$ of the runner wheel 8, whereas its stator 11 is supported in the dam or foundation 3. The axis of the turbine 5 is preferably horizontally aligned, but inclinations deviating somewhat from the horizontal to a certain degree are permissible, without the advantages of the arrangements according to the invention being lost.

In the dam or barrier wall 3 there is provided a slit or opening 12 which extends at least approximately vertically, although here also certain inclinations are permissible. This vertical slit or opening 12 is constructed such that the shutoff device 6, typically a slideable shutoff element, and preferably constructed as a dam panel or gate, can slide downwards within such vertical slot 12 even if under pressure, i.e., even when subjected to a pressure head. Above the connection channel 4 and above the maximum sea level there is arranged an engine room 14 or the like provided with a drive motor 15, by means of which the shutoff device 6 can be again raised into an upper position by means of a suitable rope or cable 16 or other appropriate traction device. Obviously, other suitable constructions of hoisting mechanisms for the shutoff device 6 can be provided. Consequently, it is possible to selectively close off at the side of the reservoir 2, even with a water level difference on both sides of the dam or barrier wall 3, either the connection or flow channel 4 or the turbine 5, in other words the main channel 3' within which there is arranged such turbine.

Figure 3:
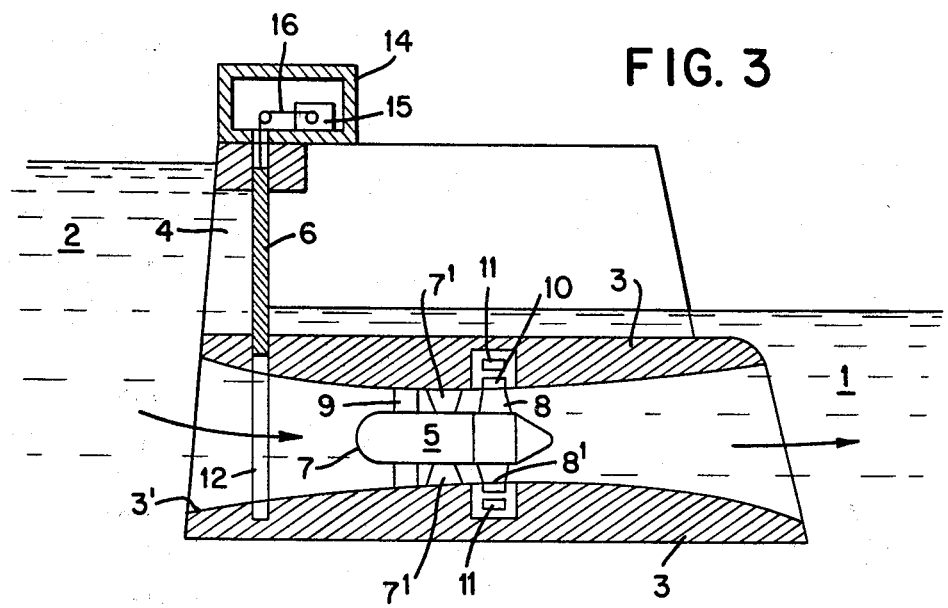
FIG. 3 shows a vertical section through the tidal power plant of FIG. 2 as the tide falls or during the ebb tidal cycle.

While in the embodiment of FIG. 2 there has been depicted a power plant unit in which the through-flow of the water through the turbine 5 is blocked by the shutoff device 6, whereas the connection channel 4 is open for the through-flow of water, FIG. 3 shows the same power plant unit with the shutoff device 6 raised, so that in this case there is possible a flow of the water through the turbine 5, whereas the connection or flow channel 4 is obturated. During operation of the tidal power plant, the shutoff device 6 is actuated such that on rising tide, as has been represented in FIG. 2, the connection channel 4 is opened and the water can flow in, without any substantial obstacle, from the sea 1 into the storage reservoir or basin 2, and quickly fills up such reservoir 2 to the maximum water level. As soon as this stage has been reached, then the shutoff device 6 is raised into the position shown in FIG. 3, so that now the connection channel 4 is closed off. The through-flow of the water through the turbine 5, however, is now opened, and mainly is accomplished in the direction of flow in which energy is generated. The water now can flow back out of the storage reservoir 2 through the turbine 5 into the open sea 1 or other body of water, while releasing energy. In this way, a considerable proportion of the total tidal phase or cycle from the maximum to the minimum water level can be beneficially exploited for the extraction of energy, so that the efficiency of the power plant unit becomes optimal. The equipment for raising the shutoff device 6 also can be constructed such that the shutoff device 6 can be withdrawn completely upwardly right out of the connection or flow channel 4. In this case, both the connection channel 4 and the turbine 5 are open in the corresponding tidal flow phase. This is expedient if the turbine 5 is provided with a distributor 9, by means of which it also can be closed without the aid of the shutoff device 6. In this case, the shutoff device 6 only serves to close off the turbine 5 in case of an emergency, i.e., on failure of the distributor or guide device 9. A slightly greater overall height must be accepted in this instance.

Figure 4:
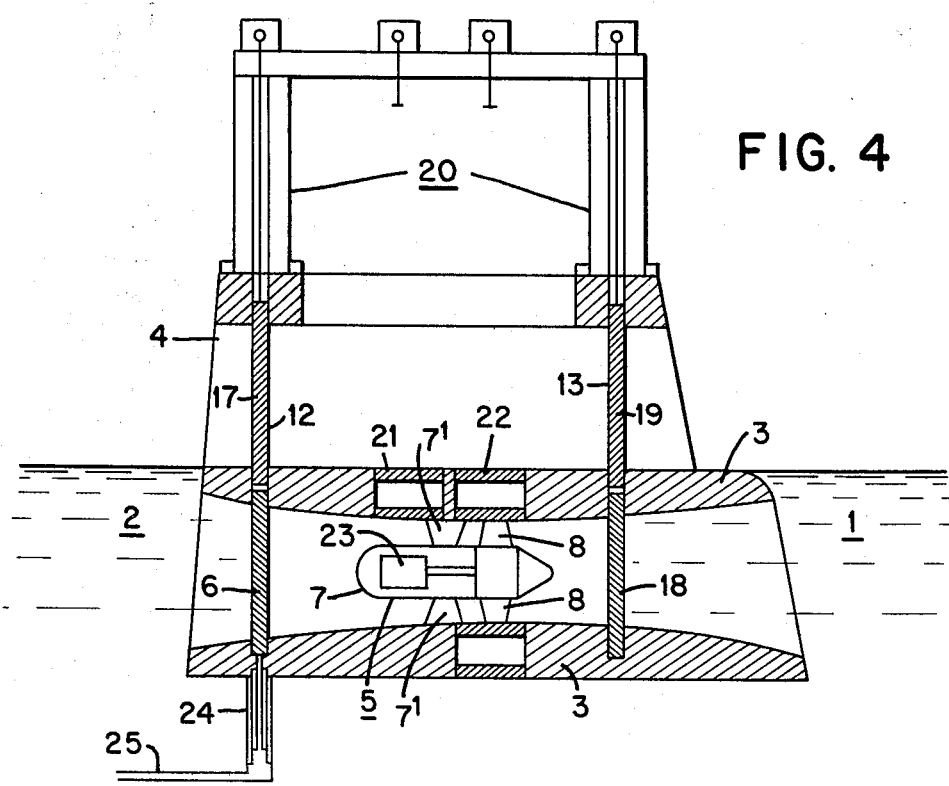
FIG. 4 illustrates an alternative embodiment of tidal power plant according to the invention in its inspection and revision condition.

In FIG. 4 there has been depicted another embodiment of the invention, wherein the tidal power plant unit has been shown in its inspection condition where there can be undertaken repair and maintenance work to the extent needed. Here, by way of convenience there have been generally designated with the same reference numerals identical or analogous components as in the preceding FIGS. 1 to 3. To enable inspection of the installation, for instance in the case of breakdown or for periodic maintenance, a mobile crane carriage or truck 20 is provided above the maximum water level and the connection or flow channel 4. This crane carriage 20 is able to move over the individual power plant units, such as those shown in the arrangement of FIG. 1, and therefore allows parts of the unit which need replacement or repair to be appropriately serviced, for instance turbine parts which have to be replaced, to be brought ashore and replacement parts to be installed in lieu thereof.

To carry out a necessary inspection, firstly the shutoff device 6 is brought at the side of the reservoir 2 in a position where it is in front of the related turbine 5. Through the open connection or flow channel 4, there thus occurs a water level equalization between the open sea 1 and the storage reservoir or basin 2. Now additional shutoff devices or elements, such as the flood gates 17, 18 and 19, are brought in by the crane carriage 20, and these are then inserted into the free space of the slot 12 above the device 6 and into a further slot or opening 13 located at the sea side of the turbine, and consequently cut-off the turbine 5 and the connection or flow channel 4 at both sides or ends thereof. Now the turbine 5 is accessible by opening the access and closure covers 21 and 22 at the base of the connection channel 4 and the necessary replacement of other work can be carried out. Since the flood gates or shutoff elements 17, 18 and 19 are only set when the water level is equal, they can be of considerably simpler construction than the device 6 which must operate under pressure, and which as an operating element which is constantly in use must be able to be operated without fault under pressure. The arrangement described therefore can operate satisfactorily with one single element of this type. Hence, the turbine 5 and the connection channel 4 can be isolated from either or both sides.

In place of an outer rim-tube turbine, in the embodiment according to FIG. 4 there has been shown another type of turbine, namely, a so-called bulb-turbine in which the electric generator 23 is arranged internally of the inflow body member 7 along the axis of the runner wheel 8. Other embodiments of water turbines can, of course, be used such as, for example, turbines with or without a non-closeable distributor or guide apparatus. In connection with a variable rotational-speed generator, which allows the rotational speed to be optimally selected in all operating conditions, i.e., with variable drop height, in order to obtain a maximum efficiency, it is thus possible to arrive at a particularly simple construction. Here, it is advantageous to construct two shutoff devices as operating elements, one on the upper water side for the overflow, and one on the lower water side in the suction pipe for the shutdown and starting-up of the turbine.

Likewise, other known shutoff or sluice devices can be used within the scope of the invention, and without loss of the technical advantages referred to. Also in the embodiment of FIG. 4, in place of a hoisting apparatus operated by a rope or cable for the shutoff device 6, there also could be provided an oil-pressure hoisting apparatus 24. This has been shown, for example, in the lower part of the dam 3 beneath the slot 12, and supplied with oil or other suitable fluid medium by means of the pipes or conduits 25 according to the operating phase under corresponding pressure for the selective retraction or extension of the telescopic hoisting devices 24. This embodiment has the advantage that an engine room is not required, and thus, the overall height is reduced. Of course, any suitable hoisting mechanism may be used as previously indicated.

Although, as described above, the operation of the turbine is, in most cases, more favorable only on a falling tide or ebb tidal cycle, and yields the highest generation of energy, with certain topographical situations, for instance, if the reservoir does not permit a particularly high filling level, the reverse operation, however, can be more advantageous, in which the turbine is operational on a rising tide and the connection or flow channel is opened on a falling tide. However, the invention is not restricted to a mode of operation in only one direction (single effect). Advantages are attainable also with reversible operation, alternating in both directions (double effect).

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A tidal power plant for generating energy from tidal movement of water, comprising:
   means providing a main channel subject to tidal flows and arranged between a sea body and a single storage reservoir separated from the sea body;
   at least one water turbine disposed in said main channel subject to tidal flows and arranged between said sea body and said single storage reservoir;
   a connection channel arranged above said turbine between said sea body and said single storage reservoir;
   a common shutoff device located at one end of said at least one turbine and operable under pressure to selectively control the flow of water through the main channel and the turbine located therein and the connection channel alternatively and in opposite directions;
   said common shutoff device comprising a slidable shutoff element;
   substantially vertical slit means in which there is slidable said common shutoff device; and
   said shutoff element comprising a slidable panel flood gate.

2. The tidal power plant as defined in claim 1, wherein:
   said turbine comprises a tube turbine; and
   said tube turbine containing a rotatable runner wheel and a central inflow body member.

3. The tidal power plant as defined in claim 1, wherein:
   said turbine comprises a tube turbine; and
   said tube turbine containing a rotatable runner wheel and a central inflow body member.

4. The tidal power plant as defined in claim 1, wherein:
   said turbine comprises a bulb-turbine;
   said bulb-turbine containing a central inflow body member; and
   an electric generator arranged in said central inflow body member.

5. The tidal power plant as defined in claim 1, wherein:
   said turbine comprises an outer rim turbine containing a runner wheel having an outer rim; and
   an electric generator provided on the outer rim of said runner wheel.

6. The tidal power plant as defined in claims 2 or 4, further including:
   closeable guide means provided for said turbine upstream of said runner wheel.

7. The tidal power plant as defined in claim 1, wherein:
   said turbine is structured to generate energy in response to water flow in only one direction.

8. The tidal power plant as defined in claim 1, wherein:
   said common shutoff device is moveable into a position which permits flow through both the turbine and the connection channel.

9. The tidal power plant as defined in claim 1, further including:
   at least one additional shutoff device for controlling the flow of water through the turbine and connection channel from either side and being settable at a water level equilibrium position.

10. The tidal power plant as defined in claim 9, wherein:
    said additional shutoff device is arranged at the side of the turbine and connection channel opposite that of said first mentioned shutoff device.

11. The tidal power plant as defined in claim 1, wherein:
    said shutoff device is additionally moveable into a position where both the turbine and the connection channel are open.

12. The tidal power plant as defined in claim 7, wherein:
    said turbine is structured to generate energy in response to water flow in the direction from the single storage reservoir to the sea body.

13. The tidal power plant as defined in claim 1, further including:
    a barrier wall interposed between said sea body and single storage reservoir;
    said barrier wall having a predetermined width;
    said main channel and connection channel being formed in said barrier wall; and
    said main channel and connection channel extending essentially over the entire width of the barrier wall, so that essentially said entire width of said barrier wall can be utilized for the extraction of energy from the tidal movement of the water.

14. The tidal power plant as defined in claim 13, wherein:
    said single storage reservoir is constituted by a natural bay which is separated at a mouth thereof from said sea body by said barrier wall.

15. A method of operating a tidal power plant for generating energy from tidal movement of water, comprising the steps of:
    providing at least one water turbine in a main channel subject to tidal flows and arranged between the sea and a single storage reservoir separated from the sea;
    providing a connection channel above the turbine and between said sea and single storage reservoir;
    providing a common shutoff element located at one end of said at least one turbine and operable under pressure to selectively control the flow of water through the turbine and the connection channel alternatively and in opposite directions; and
    positioning the shutoff element so as to permit flow through the connection channel from the sea to the single storage reservoir on a rising tide and to direct flow through the turbine from the single storage reservoir on a falling tide.

16. The method as defined in claim 15, further including the steps of:

positioning the shutoff element so as to cut-off flow through the turbine when water is flowing in the connection channel.

17. The method as defined in claim 15, further including the steps of:

providing additional shutoff elements which are set when the water levels in the reservoir and sea are essentially equal in order to isolate the turbine and the connection channel from the single storage reservoir and the sea.

18. A tidal power plant for generating energy from tidal movement of water, comprising:

means providing a main channel subject to tidal flows and arranged between a sea body and a single storage reservoir separated from the sea body;

at least one water turbine disposed in said main channel subject to tidal flows and arranged between said sea body and said single storage reservoir;

said turbine comprises an outer rim turbine containing a runner wheel having an outer rim;

an electric generator provided on the outer rim of said runner wheel;

a connection channel arranged above said turbine between said sea body and said single storage reservoir;

a common shutoff device located at one end of said at least one turbine and operable under pressure to selectively control the flow of water through the main channel and the turbine located therein and the connection channel alternatively and in opposite directions;

said common shutoff device comprising a slidable shutoff device;

substantially vertical slit means in which there is slidable said shutoff device; and said shutoff element comprising a slidable panel flood gate.

* * * * *